Oct. 11, 1927.
P. J. FITZGERALD
ARMATURE
Filed July 16, 1925
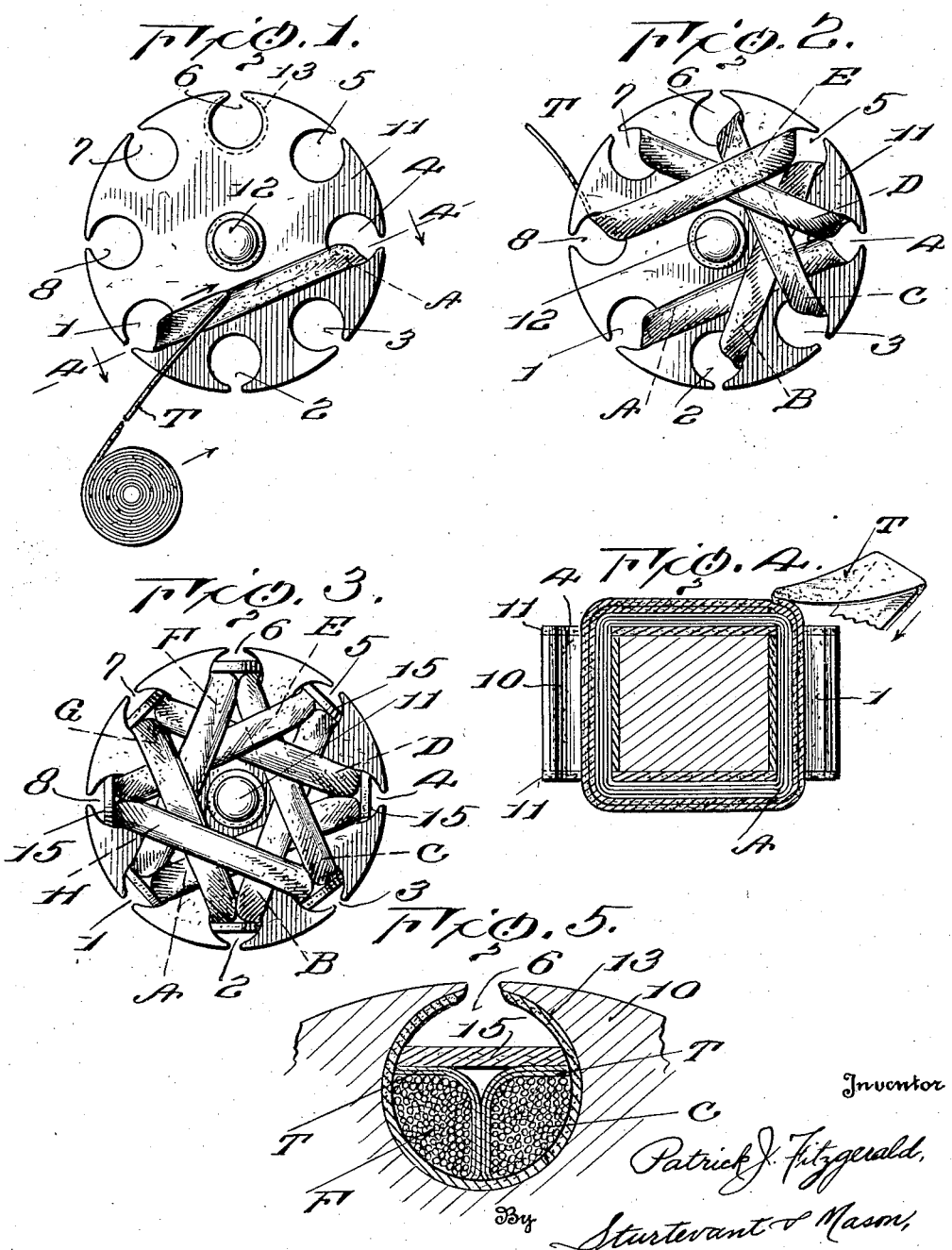

Patented Oct. 11, 1927.

1,644,718

UNITED STATES PATENT OFFICE.

PATRICK J. FITZGERALD, OF TORRINGTON, CONNECTICUT, ASSIGNOR TO THE FITZGERALD MANUFACTURING COMPANY, OF TORRINGTON, CONNECTICUT, A CORPORATION OF CONNECTICUT.

ARMATURE.

Application filed July 16, 1925. Serial No. 44,051.

This invention relates to improvements in armatures and to the methods of winding and insulating the same.

Heretofore in the manufacture of small armatures for minor electrical appliances, when it was sought to employ enamel wire for the conductors and thereby attain saving in wire with increase of compactness and efficiency, it was found that if the armature be baked and varnished, the friction resulting by the expansion and contraction of the several coils with regard to each other caused a wear upon or erosion of the relatively thin enamel layer, with the establishing of a short-circuit between the coils in question. Further, it was found necessary to pre-heat the armature before the varnish was applied, in order to get rid of any moisture which might be present in it: which was a further occasion for friction to occur between the several coils. In fact, one-third to one-half of the armatures wound by this old method were rejected upon inspection after varnishing and baking, as being short-circuited between two or more coils, with a resultant loss of much time and material.

The present invention proposes a system of winding armatures, and particularly enamelled wire armatures, in which the difficulties of friction between coils is largely alleviated; and with corresponding work, only one or two per cent are rejected upon inspection. It consists in brief of placing a layer of insulating tape between the coils at all points where they otherwise would be in contact. This tape is a mechanical protection to prevent a disastrous rubbing between coils, and further assists by electrically insulating the coils themselves as entireties. A further feature of the invention is a system of winding by which one or more pieces of tape are employed as insulation between all the coils.

Fig. 1 is an end view of the armature block, showing the first coil being taped.

Fig. 2 is a similar view, with five coils in position, and the fifth coil being taped.

Fig. 3 shows all coils in position and taped, with the clamping plugs inserted.

Fig. 4 is a section on 4—4 of Fig. 1.

Fig. 5 is a section through a slot on an enlarged scale.

The core of the armature is composed of a body 10 of laminated steel, with the insulating end plates 11. This body is mounted on and concentric to a shaft 12, and is locked against axial or angular movement relative to the shaft. In the outer periphery of the core are provided a plurality of winding slots, here shown as circular in section and eight in number, designated 1, 2, 3, 4, 5, 6, 7, 8 respectively. It is preferred, though not essential, to place a split insulating sleeve 13 in each slot as shown in section in Fig. 5 and indicated by dotted lines for one slot in Fig. 1.

When the core has been assembled in the indicated fashion, it is placed upon a winding machine, and a desired number of turns of enamel wire are wound in a coil A lying in slots 1 and 4. When the winding is complete, and before the winding machine has been moved, a portion of the tape T is wound over the coil lying in the slots and across the ends of the core, to enclose and protect it.

The core is rotated, so that a coil B may then be wound in slots 2 and 5, and over the taped part of coil A lying across the end plates. During this operation, the tape is held at one side by a suitable clip or bracket on the frame of the winding machine, so as not to interfere with the orderly placing of the second coil B. When coil B is complete, this same tape is wound over and around this coil to protect it.

The core is again rotated, and coil C is wound into slots 3 and 6, and then taped as before. The coils D and E are then successively wound and taped. The armature now presents the appearance of Fig. 2, in which each succeeding coil overlies the subjacent ones, and is separated therefrom by the taping which has been placed over the lower coil. It will be noted that in the finished armature, two such windings lie in each slot.

The winding and taping are successively continued for coils, F, G, H until two such windings lie in each slot, as shown in Fig. 3. Each successive winding holds down the previous windings and tapings.

To hold the tapings and windings in position against centrifugal force during operation, it is preferable with small armature to force a plug 15 into each slot (Fig. 3), which binds the members together and is itself held in place by the elasticity of the tightly wrapped windings and tapings.

The assembly is then heated to dry the enamel and tape and to remove any moisture; and finally varnished and baked. The expansion and contraction during the heatings and coolings incidental to these operations, and subsequently possible during use, are absorbed by the tapings without the windings rubbing upon each other to wear away the insulating material.

It is apparent that other than enamel wire may be utilized, and that the particular form of core or type of winding is immaterial: the gist of the invention resides in separating the individual coils by taping, and preferably by use of a single piece of tape.

I claim:

1. An armature having a plurality of coils of wire successively wound in the slots of a core and crossing one another at the ends of the core, and a continuous tape passing over each successive coil so that a layer of tape is present between each two coils at their mutual crossings.

2. An armature having a plurality of coils of enamelled wire wound in the slots of a core and crossing one another at the ends of the core, and a tape wound over each successive individual coil after it has been wound to separate it from all juxtaposed and superposed coils.

3. An armature having a plurality of coils of wire wound successively in the slots of a core, a single continuous tape passing over each successive coil as wound so that a layer of tape is present at the ends of the core between each two coils at their mutual crossing, and means fitted in each slot to hold said coils and tapings in position.

In testimony whereof, I affix my signature.

PATRICK J. FITZGERALD.